(12) United States Patent
Hall

(10) Patent No.: US 6,237,963 B1
(45) Date of Patent: May 29, 2001

(54) SERVICE RISER

(75) Inventor: Howard W. Hall, Shawnee, OK (US)

(73) Assignee: Uponor Innovation AB, Fristad (SE)

(*) Notice: Subject to any disclaimer, the term of this patent is extended or adjusted under 35 U.S.C. 154(b) by 0 days.

(21) Appl. No.: 09/206,043

(22) Filed: Dec. 4, 1998

(51) Int. Cl.[7] ........................ F16L 55/00
(52) U.S. Cl. ............ 285/55; 285/123.1; 285/123.15
(58) Field of Search .................. 285/55, 123.15, 285/123.1

(56) References Cited

U.S. PATENT DOCUMENTS

| | | | |
|---|---|---|---|
| 1,088,491 | * 2/1914 | Waitz | 285/55 |
| 2,226,039 | * 12/1940 | Wiltse | 285/55 |
| 3,834,012 | 9/1974 | Pogonowski | 29/523 |
| 4,085,950 | * 4/1978 | Alewitz | 285/123.15 |
| 4,426,761 | 1/1984 | Sassak | 29/447 |
| 4,482,170 | 11/1984 | Jacobson et al. | 285/55 |
| 4,519,634 | 5/1985 | Hand | 285/55 |
| 4,801,159 | 1/1989 | Sehorn | 285/55 |
| 4,922,971 | * 5/1990 | Grantham | 285/123.15 |
| 5,135,267 | 8/1992 | Wilson | 285/174 |
| 5,285,744 | * 2/1994 | Grantham et al. | 285/123.15 |
| 5,590,914 | 1/1997 | Platner et al. | 285/23 |

FOREIGN PATENT DOCUMENTS

| | | |
|---|---|---|
| 195 43 103 A1 | 10/1996 | (DE) . |
| 0 539 728 A1 | 5/1993 | (EP) . |
| 2 280 939 | 8/1993 | (GB) . |

* cited by examiner

Primary Examiner—Lynne H. Browne
Assistant Examiner—Tomlyne A Malcolm
(74) Attorney, Agent, or Firm—Fish & Richardson P.C.

(57) ABSTRACT

A service riser 10 comprises a steel jacket 11 around a polyethylene pipe 12 which terminates in the riser at a transition zone 20. The transition zone 20 comprises a retainer sleeve 30 inserted in the end of the pipe 12 and sealed thereto by an O-ring 38. The retainer sleeve 30 extends out of the pipe 12 and is provided with grooves 46 separated by lands 48 on which an elastomeric sealing band 52 is received. The tube 11 is swaged down forming a swage groove 56 around the retainer sleeve 30 compressing the gasket 52 to a large extent over the lands 48 and a lesser extent over the grooves 46, the ideal compression for the gasket 52 being arranged somewhere between such degrees of compression. By this means the ideal degree of compression at some regions of the gasket 52, forming an annulus around the retainer sleeve 30, is guaranteed, despite tolerances in the dimensions of the tube 11 (especially) as well as the band 52 and sleeve 30.

16 Claims, 1 Drawing Sheet

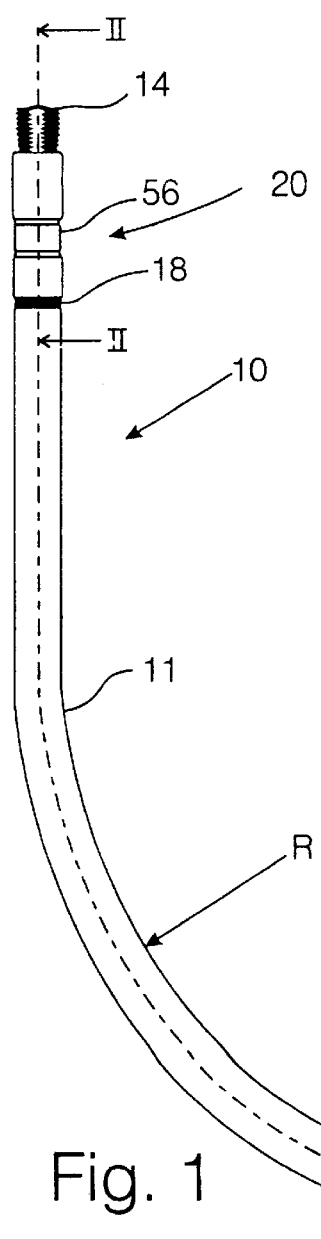
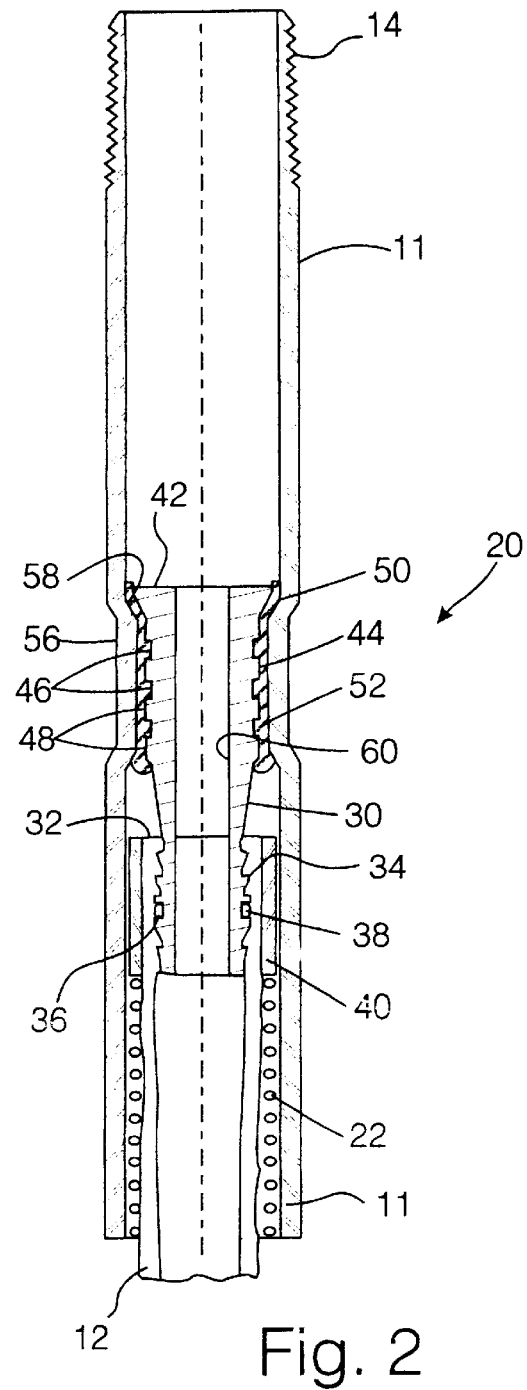
Fig. 1
Fig. 2

SERVICE RISER

BACKGROUND OF THE INVENTION

This invention related to a service riser, particularly for use in the gas supply industry.

Gas is increasingly supplied through plastics pipes, especially polyethylene pipes although not exclusively so. The main advantage of plastics pipes is their resistance to corrosion and their flexibility. However where a plastics pipe is buried underground and rises to the surface to supply a house or other establishment, it is desirable to shield it. Also, of course, it requires an adapter at its end for connection to a meter or other equipment in the house. Indeed there are various regulations in different jurisdictions that require this additional protection at the transition from under- to overground.

Numerous patents describe such systems. For example U.S. Pat. No. 4,482,170 (Jacobson et al) discloses gas riser apparatus in which a metal tube is swaged to produce an internal step. The plastics pipe is terminated with an internal strengthening sleeve (to give the pipe radial compression strength), a collar then being swaged down around the end of the pipe, teeth on the collar biting into the plastics material. The end of the pipe is then pulled back into the metal tube with the collar then squeezing between itself and the internal step an elastomeric seal ring which thus seals the tube against the pipe. The tube then becomes the gas carrier and usual connection means are provided on the end of the tube for connection to a meter etc. The tube is finally indented or pinched onto the collar to retain the collar in position.

The tube is generally of mild steel meeting specific requirements but, usually, it has quite a wide tolerance on its dimensions. Thus, for example, a thread typically formed on its end is frequently tapered, at least partly so as to accommodate these wide tolerance.

U.S. Pat. No. 4,801,159 (Seborn) discloses another suitable arrangement, not dissimilar to the above-described arrangement. Other arrangements are disclosed in U.S. Pat. No. 4,519,634, U.S. Pat. No. 5,590,914 and EP-A-0539728.

Because the metal tube is at least partly taken underground it is necessary that it be provided with effective environmental protection. This is normally afforded by coating with an epoxy resin or the like or by galvanising the tube. In such a case a minimum of reworking should be effected when connecting the tube to the end of the gas pipe to avoid disturbing the environmental protection. However, some methods involve fitting an adapter to the end of the pipe and then welding the adapter to the tube. This of course renders re-application of protection necessary.

It is therefore an object of the present invention to provide a riser which is simple to construct, meets all relevant standards and requirements and has minimum disruption of the environmental seal.

SUMMARY OF THE INVENTION

In accordance with the present invention, there is therefore provided a riser comprising:
a plastics pipe sealed inside a protective tube intermediate the ends thereof;
a retainer sleeve and compression band on the end of the pipe between them compressing the wall of the pipe and retaining and sealing the sleeve on the pipe; and,
an elastomeric band on the sleeve and compressed against the sleeve by a swaging of the tube.

Preferably, the sleeve is partially inserted in the pipe and said band is on an exposed end of the sleeve.

Preferably, the sleeve has at least one circumferential step overlapped by the band so that the band is compressed to different degrees. In that event, it is preferably compressed to a first, small degree on one side of the step and to a second larger degree on the other side of the step, an ideal compression degree for optimum sealing by said elastomeric band lying between said first and second degrees for all size tolerances of said sleeve, band and tube.

Preferably two steps are provided defining a groove. Indeed, there may be several axially spaced grooves along the sleeve. Moreover, the grooves may be of different depths.

Preferably, the sleeve is flared on at least one side of the swaging to resist withdrawal of the pipe in the direction of said swaging. However, preferably, the sleeve is flared at its end remote from said pipe.

Preferably the sleeve in contact with the pipe has a serrated profile so that, on being clamped between the sleeve and compression band, the material of the pipe cold-flows into the serrations of the sleeve.

Preferably, at least one groove is formed between serrations to receive an O ring elastomeric seal to seal the sleeve with respect to the pipe.

In another aspect, the invention provides a service riser for a gas line comprising a plastics material pipe, wherein the service riser comprises a metal tube surrounding and protecting the pipe and transferring the flow of gas from the pipe to the tube, the tube having two ends, one end having a connector for gas equipment and the other end surrounding the pipe, the end of the pipe terminating intermediate the ends of the tube at a transition joint, the transition joint comprising a transition sleeve partially inserted in the end of the pipe and having a compression band around the end of the pipe so that the end of the pipe is squeezed between the transition sleeve and compression band to retain and seal the sleeve in the pipe, the exposed end of the transition sleeve having a flared end, and circumferential grooves spaced from the said flared end, an elastomeric band being disposed on the exposed end, the tube being swaged around the exposed end so as to prevent pull out of the pipe from the tube, at least in the direction of the end thereof surrounding the pipe, and to compress the elastomeric band to seal the retainer sleeve to the tube.

BRIEF DESCRIPTION OF THE DRAWINGS

The invention is further described hereinafter, by way of example, with reference to the accompanying drawings, in which:

FIG. 1 is a side view of a riser according to the present invention, and,

FIG. 2 is a section along the line II—II in FIG. 1, showing a detail of the transition zone.

DETAILED DESCRIPTION

A gas service riser 10 comprises a smoothly curving metal tube 11 which receives a plastics pipe 12. The end of the pipe 12 terminates inside the tube 11 near its end 14 where the tube 11 is threaded externally to receive a coupling from a gas meter, manifold or other equipment (not shown). Where the pipe 12 exits the other end 16 of the tube 10, a moisture seal is provided to prevent the ingress of moisture between the pipe 12 and tube 11.

In use, the pipe 12 is underground and connects to a gas main. Indeed, the tube 12 can be provided with a ground-line mark 18 showing the intended ground level. Although the riser 10 is shown curving through an angle of about 90 degrees, (with a radius R of about 30 cm), other riser forms are known, such as straight risers and risers protected, not by the solid tube 10 as shown, but by flexible hose, so that it may be turned through any desired angle. However, none of these alternative forms are relevant to the present invention which is concerned with the transition shown zone 20, shown in more detail in FIG. 2.

Referring to FIG. 2, the plastics pipe 12 within the tube 11 may additionally be protected by a mesh 22. Prior to assembly, a retainer sleeve 30 is inserted in the end 32 of the pipe 12. The retainer sleeve 30 has numerous serrations 34 including a groove 36 about half way along its length and incorporating an elastomeric O-ring seal 38. After insertion of the retainer sleeve 30 into the pipe end 32, a compression band 40 is slid over the end of the pipe 32 and compressed radially so as to cause the plastics material of the pipe 12 to cold-flow into the serrations 34 thereby rendering pullout of the retainer sleeve 30 from the pipe 12 substantially impossible. Moreover, the compression brings the material of the pipe 12 into intimate compressive contact with the elastomeric seal ring 38 so as to effect complete gas sealing between the retainer sleeve 30 and pipe 12.

An exposed end 42 of the retainer sleeve 30 extends from the pipe 12 and has a substantially cylindrical surface 44 having a plurality of circumferential grooves 46. The grooves 46 define steps 48 surrounding each groove. At its distal end, the sleeve 30 is provided with a flared or chamfered shoulder 50.

Before insertion into the tube 11, an elastomeric band 52 is placed over the exposed end 42 of the transition sleeve 30 overlapping several grooves 46 and steps 48. The riser is now ready for assembly and the pipe 12 with the retainer 30 protruding therefrom is inserted into the tube 11 until the retainer is positioned about 7 centimeters from the threaded end 14 of the tube 11.

When positioned as required, a swaging tool compresses the walls of the tube 11 to form a swage groove 56 around the entire periphery of the tube 10. Internally, the swage groove 56 compresses the elastomeric band 52 into the grooves 46. The flared end 50 abuts a top shoulder 58 of the swage groove 56 and prevents pullout of the pipe 12 in the direction of the end 16 of the tube 10. Pullout in the other direction is not usually a problem; nevertheless, a flared flange could be provided at the other end of the swage groove 56 on the retainer sleeve 30.

Equally important, however, the elastomeric sealing band 52 also effects a seal between the transition sleeve 30 and the tube 11 so that now there is a sealed gas passage from the inside of the pipe 12, through a bore 60 of the transition sleeve 30 and into tube 11 adjacent its threaded end 14.

The tube 11 can therefore be supplied pre-treated with an epoxy coating or a galvanised surface, the swaging operation being found not to interfere with the efficient protection offered by the environmental coating so formed.

The typical standard for gas pipes (constituted by the tube 11 once the gas leaves the transition zone 20), employs a Schedule 40 steel tube which has a wide tolerance in its dimensions. It is also well known that the ideal degree of compression for an elastomer such as BUNA-N rubber is 25%, in order to achieve the most effective sealing and to ensure that the seal is maintained in all environmental and service conditions likely to be experienced. It is for this reason that the grooves 46 are provided so that, within all tolerances of the sleeve 30, band 52 and tube 11, the elastomer overlying the lands 48 will always be overcompressed (i.e. by more than 25%). On the other hand, elastomer overlying the grooves 46 will always be undercompressed (i.e. less than 25%). It therefore follows that in transition regions between the centre of each groove 46 and the centre of adjacent lands 48, such regions being in the forms of rings around the retainer 30, where the ideal compression is experienced. Thus for all tolerances of the components ideal sealing conditions should always be achieved.

What is claimed is:

1. A riser comprising:
    a plastics pipe sealed inside a protective tube intermediate the ends thereof;
    a retainer sleeve and compression band on the end of the pipe between them compressing the wall of the pipe and retaining and sealing the sleeve on the pipe, wherein the retainer sleeve is a single, integral piece and extends from the end of the pipe; and
    an elastomeric band on the retainer sleeve beyond the end of the pipe and compressed against the sleeve by a swaging of the tube; wherein the sleeve has at least one circumferential step overlapped by the elastomeric band so that the elastomeric band is compressed to different degrees on either side of the step, and the material of the elastomeric band has an ideal compression degree for optimum sealing conditions between two objects, wherein the elastomeric band is compressed to a first, small degree on one side of the step and to a second, larger degree on the other side of the step, the ideal compression degree ling between said first and second degrees for all size tolerances of said sleeve, elastomeric band, and tube.

2. A riser as claimed in claim 1, wherein two steps are provided defining a groove therebetween.

3. A riser as claimed in claim 2, wherein several of said grooves are provided axially spaced along the sleeve.

4. A riser as claimed in claim 3, wherein the grooves are of different depths.

5. A riser as claimed in claim 1, wherein the sleeve is flared on at least one side of the swaging to resist withdrawal of the pipe in the direction of said swaging.

6. A riser as claimed in claim 5, wherein said flaring is at the end of the sleeve which is remote from the pipe.

7. A riser as claimed in claim 1, wherein the surface of the sleeve abutting the pipe has serrations therein into which the material of the pipe cold-flows during compression of the pipe between the retainer sleeve and compression band.

8. A riser as claimed in claim 1, in which a groove is formed on the surface of the sleeve abutting the pipe and in which groove there is disposed an elastomeric seal ring serving to seal the pipe from the sleeve.

9. A riser comprising:
    a plastics pipe sealed inside a protective tube intermediate the ends thereof;
    a retainer sleeve and compression band on the end of the pipe between them compressing the wall of the pipe and retaining and sealing the sleeve on the pipe; and
    an elastomeric band on the sleeve and compressed against the sleeve by a swaging of the tube;
    wherein the retainer sleeve is a single, integral piece having at least one circumferential step overlapped by the elastomeric band so that the elastomeric band is compressed to different degrees on either side of the step; the material of the elastomeric band has an ideal compression degree for optimum sealing conditions between two objects; and the elastomeric band is compressed to a first, small degree on one side of the step and to a second, larger degree on the other side of the step, said ideal compression degree lying between said first and second degrees for all size tolerances of said sleeve, elastomeric band and tube.

10. A riser comprising:

a plastic pipe sealed inside a protective tube intermediate the ends thereof;

a retainer sleeve and compression band on the end of the pipe between them compressing the wall of the pipe and retaining and sealing the sleeve on the pipe, the retainer sleeve extending from the end of the pipe; and an elastomeric band on the retainer sleeve beyond the end of the pipe and compressed against the sleeve by a swaging region of the tube, wherein the extended end of the sleeve contains a plurality of grooves axially spaced along the sleeve opposite the swaging region of the tube.

11. The riser of claim 10, wherein the plurality of grooves are of different depths.

12. The riser of claim 10, wherein the sleeve is flared on at least one side of the swaging to resist withdraw of the pipe in the direction of the swaging.

13. The riser of claim 12, wherein the flaring is at the end of the sleeve which is remote from the pipe.

14. The riser of claim 10, wherein the surface of the sleeve abutting the pipe has serrations therein into which the material of the pipe cold-flows during compression of the pipe between the retainer sleeve and compression band.

15. The riser of claim 10 further comprising a groove formed on the surface of the sleeve abutting the pipe and an elastomeric seal ring disposed in the groove to seal the pipe from the sleeve.

16. A riser comprising:

a plastics pipe sealed inside a protective tube intermediate the ends thereof, a retainer sleeve and compression band on the end of the pipe between them compressing the wall of the pipe and retaining and sealing the sleeve on the pipe, wherein the retrainer sleeve is a single, integral piece and extends from the end of the pipe; and an elastomeric band on the retainer sleeve beyond the end of the pipe and compressed against the sleeve by a swaging of the tube, wherein the sleeve is flared on at least one side of the swaging to resist withdrawal of the pipe in the direction of said swaging, and said flaring is at the end of the sleeve which is remote from the pipe.

* * * * *